(12) United States Patent
Grimm et al.

(10) Patent No.: US 11,908,609 B2
(45) Date of Patent: Feb. 20, 2024

(54) WINDING ARRANGEMENT FOR A LINEAR MOTOR WITH COIL PAIRS ARRANGED IN PARALLEL MADE FROM A CONTINUOUS ELECTRICAL CONDUCTOR

(71) Applicant: Intrasys GmbH Innovative Transportsysteme, Munich (DE)

(72) Inventors: Arnulf Grimm, Burggen (DE); Tobias Hollmer, Munich (DE)

(73) Assignee: Intrasys GmbH Innovative Transportsysteme, Munich (DE)

( * ) Notice: Subject to any disclaimer, the term of this patent is extended or adjusted under 35 U.S.C. 154(b) by 396 days.

(21) Appl. No.: 17/382,662

(22) Filed: Jul. 22, 2021

(65) Prior Publication Data

US 2022/0028600 A1    Jan. 27, 2022

(30) Foreign Application Priority Data

Jul. 24, 2020  (DE) ..................... 10 2020 119 589.3

(51) Int. Cl.
  *H01F 27/28*  (2006.01)
(52) U.S. Cl.
  CPC ..... *H01F 27/2823* (2013.01); *H01F 27/2876* (2013.01)
(58) Field of Classification Search
  CPC .. H02K 3/28; H02K 3/04; H02K 3/12; H02K 3/47; H02K 3/522; H02K 3/38;
  (Continued)

(56) References Cited

U.S. PATENT DOCUMENTS 5,751,077 A    5/1998  Gonzalez
6,847,133 B2   1/2005  Baccini
(Continued)

FOREIGN PATENT DOCUMENTS

DE   102006023493 B4   7/2008
JP       2012147630 A   8/2012

OTHER PUBLICATIONS

European Search Report for corresponding EP 21 18 6534 dated Dec. 10, 2021, 10 pgs.
(Continued)

*Primary Examiner* — Bryan R Perez
(74) *Attorney, Agent, or Firm* — Rankin, Hill & Clark LLP

(57) ABSTRACT

A conductive winding arrangement for generating a varying magnetic field in the neighborhood of the winding arrangement, comprising a plurality of coil pairs arranged one after another along a sequence axis with a virtual coil pair winding axis oriented transversely to the sequence axis, of which each coil pair exhibits a first coil and a second coil, each with a coil winding axis parallel or collinear respectively to the coil pair winding axis, where the first and the second coil are arranged axially adjacent to each other relative to the coil pair winding axis in such a way that turns of the first and of the second coil are axially adjacent to each other and that eye regions of the first coil and of the second coil are axially adjacent to each other while forming a common coil-pair eye region, where the coil pair winding axis penetrates through the coil-pair eye region; at least one coil pair being configured as a single conductor coil pair, in which the first and the second coil each exhibit a connecting section located radially outside relative to the coil pair winding axis for connecting to a phase of a power supply or to a further coil and in the coil-pair eye region they are connected to each other electroconductively.

22 Claims, 6 Drawing Sheets

(58) Field of Classification Search
CPC ...... H02K 41/031; H02K 41/02; H02K 41/03;
H02K 41/025; H02K 41/0356; H02K
41/033; H02K 41/0354; H02K 33/18;
H02K 33/02; H02K 33/16; H02K 1/27;
H02K 1/12; H02K 1/17; H02K 1/14
See application file for complete search history.

(56) References Cited

U.S. PATENT DOCUMENTS

| | | | |
|---|---|---|---|
| 6,914,352 | B2 | 7/2005 | Hoppe |
| 10,135,310 | B2 | 11/2018 | Schuler et al. |
| 10,862,385 | B2 | 12/2020 | Julen et al. |
| 11,075,556 | B2 | 7/2021 | Takeuchi |
| 11,165,297 | B2 | 11/2021 | Valentini |
| 2009/0179505 | A1* | 7/2009 | Hoppe ................. H02K 41/031 310/12.17 |
| 2014/0132088 | A1 | 5/2014 | Morel |
| 2020/0048016 | A1 | 2/2020 | Sinzenich et al. |
| 2021/0257872 | A1 | 8/2021 | Böhm et al. |

OTHER PUBLICATIONS

German Search Report for corresponding DE 10 2020 119 589.3 dated Jan. 12, 2022, 7 pgs.
Espacenet Bibliographic data:DE 102006023493 (B4), Published Jul. 10, 2008, 1 pg.
Chinese Office Action for corresponding CN 113972767 A dated Jun. 29, 2023, 10 pgs.

* cited by examiner

WINDING ARRANGEMENT FOR A LINEAR MOTOR WITH COIL PAIRS ARRANGED IN PARALLEL MADE FROM A CONTINUOUS ELECTRICAL CONDUCTOR

This Application claims priority in German Patent Application DE 10 2020 119 589.3 filed on Jul. 24, 2020, which is incorporated by reference herein.

The present invention concerns a conductive winding arrangement for generating a temporally and spatially varying magnetic field in the spatial neighborhood of the winding arrangement, comprising a plurality of coils, of which each exhibits a wire wound in several turns around a virtual coil winding axis, where the coil winding axis penetrates through a radially inner region of the coil free from wire turns, where the winding arrangement exhibits a first layer of first coils arranged one after another without overlapping along a sequence axis with coil winding axes parallel to each other and exhibits a second layer of second coils arranged one after another without overlapping along the sequence axis with winding axes parallel to each other, where the winding arrangement comprises a plurality of coil pairs arranged one after another along the sequence axis with a virtual coil pair winding axis oriented transversely to the sequence axis, of which each coil pair exhibits a first coil and a second coil, each with a coil winding axis parallel or collinear respectively to the coil pair winding axis, where the first and the second coil are arranged axially adjacent to each other relative to the coil pair winding axis in such a way that wire turns of the first and of the second coil are axially adjacent to each other and that the eye regions of the first coil and of the second coil are axially adjacent to each while forming a common, spatially continuous coil-pair eye region, where the coil pair winding axis penetrates through the coil-pair eye region.

BACKGROUND OF THE INVENTION

Such a winding arrangement is known from WO 2016/202798 A1. The known winding arrangement moreover comprises a planar cooler housing through which a cooling fluid can flow. The cooler housing exhibits in every direction orthogonally to the coil pair winding axes approximately the dimensions of a coil housing that accommodates the winding arrangement. At least one coil of each coil pair of a first and second coil touches the cooler housing, such that heat arising in the coil pair due to the Ohmic resistance can be transferred by conduction to the cooler housing and from there transported away by convection through the cooling fluid.

The planar cooler housing can be arranged either between the first and the second coil of each coil pair or at one side of the coil pair.

A constant requirement for such winding arrangements is that their thickness dimension along the coil winding axes and also along the coil pair winding axes is as small as possible.

A winding arrangement with such small thickness dimension along with high copper density in the coil housing is known from DE 10 2006 023 493 B4. Winding arrangements are even known from this publication that exhibit more than two coil layers. In these known winding arrangements, the coils of different layers are arranged so as to be offset relative to each other along the sequence axis in a very complicated manner, such that for each coil it is the case that its coil section that proceeds orthogonally to the sequence axis has facing it a coil section likewise proceeding orthogonally to the sequence axis of a winding of an along the coil winding axis adjacent coil of another coil layer, and this coil section is assigned to the same electrical phase and at each point in time carries current in the same direction, whereas no coil section faces the respectively other coil section of the coil in the same adjacent coil layer that is orthogonal to the sequence axis.

Since usually in the manufacturing of a winding arrangement first the coils are arranged and after their arrangement are electrically connected to each other, i.e. wired up, the complicated arrangement and wiring of the coils of the winding arrangement known from DE 10 2006 023 493 B4 harbors an undesirably high risk of incorrect wiring of the individual coils with each other, which leads either to damage to an incorrectly wired winding arrangement and/or to undesirable cost of repairs. In addition, due to the complicated route of a large number of intercrossing conductor sections, the risk of short circuits is increased.

The coil- and planar cooling element-accommodating coil housing of the winding arrangement known from WO 2016/202798 A1 separates the two housing components which form the known coil housing completely from each other. The planar cooling element extends coextensively with the housing components. The winding arrangement known from WO 2016/202798 A1 discloses, according to its embodiment shown in FIG. 5 of WO 2016/202798 A1 with cooler housings arranged between the first coil layer and the second coil layer, separate coil layers, which taken each on its own already have to function as a winding arrangement and are only arranged next to each other along their coil winding axes in order to increase the copper fraction in the region of the coils through coil pair formation. A coil, therefore, is only connected electrically to a coil of the same layer. Indeed, to facilitate the assembly, identically constructed coil layers can be prepared and then arranged next to each other. However, this too results in high cost for electrically connecting the individual coils in the relevant layer.

Furthermore, the planar cooling element increases the width to be measured along the coil pair winding axes of the ready-to-operate winding arrangement.

It is, therefore, the task of the present invention to improve the winding arrangement mentioned in the beginning in such a way that while having essentially the same performance, it can be configured with the smallest possible thickness and a decreased error potential of the wiring of the coil pairs of the winding arrangement.

SUMMARY OF THE INVENTION

The present invention solves this task by means of a winding arrangement of the type mentioned in the beginning, in which at least one coil pair is configured as a single conductor coil pair, in which the first and the second coil each exhibit a connecting section lying radially outside relative to the coil pair winding axis for connecting to a phase of a power supply or to a further coil and they are connected to each other electroconductively in the coil-pair eye region.

Through the electrical connection of the first and the second coil of a coil pair in the eye region, the entire coil pair is formed by a single continuous electrical conductor. For this reason, such a coil pair is referred to hereunder as a 'single conductor coil pair'.

The electroconductive connection of the first and the second coil of the single conductor coil pair in the eye region makes possible the connection of the two coils in an installation space which to begin with is unoccupied, such that sufficient space is available for electroconductive connection of the two coils of the single conductor coil pair. The thus formed single conductor coil pair exhibits now only two connecting sections, to wit one connecting section each for wiring to an along the sequence axis preceding coil or power supply, in particular a preceding single conductor coil pair, and to an along the sequence axis following coil or power supply, in particular a following single conductor coil pair.

In principle, the winding arrangement can exhibit only exactly one single conductor coil pair. Because of the advantages described above, however, the winding arrangement preferably exhibits a plurality of single conductor coil pairs. Thus, one can conceive occupying each individual filling location for coils of the winding arrangement only with a single coil in the first layer or in the second layer or partly in the first and partly in the second layer. For example, the first and the last filling location of the winding arrangement along the sequence axis can be occupied only with a single coil, in order to provide at the beginning and the end of the winding arrangement, for a quantitatively specified current, an incoming or outgoing weaker magnetic field respectively, whereas all filling locations lying between the first and the last coil are occupied with single conductor coil pairs, in order to create locally the strongest possible magnetic field. Especially preferably, the winding arrangement exhibits solely single conductor coil pairs for providing the most homogeneous magnetic field possible over the whole sequence axis.

The coil winding axes of the coils of the winding arrangement, in particular the coil pair winding axes of the winding arrangement, are preferably parallel to each other and arranged one after another along the sequence axis. The winding arrangement served in a preferred embodiment as a winding arrangement of a linear motor and exerts in interaction with a magnet arrangement in the case of a synchronous motor or with an inductive arrangement, such as e.g. a plate made from an electroconductive material in the case of an asynchronous motor, a force acting along the sequence axis on the magnet arrangement or inductive arrangement respectively moving along the sequence axis relative to the winding arrangement. Normally the winding arrangement, due to the power supply needed in the case of use as part of a linear motor, is arranged as a linear motor stator attached firmly to a route traversed by a vehicle driven by a linear motor, whereas the magnet arrangement or the inductive arrangement respectively is arranged so as to be attached firmly to the vehicle. The vehicle is preferably railbound. The winding arrangement discussed here is used preferably in fairground rides for public entertainment, such as e.g. in rollercoasters, ghost trains, water rides, where however use in public or private rail transportation should also not be ruled out. The track can therefore be defined by a single rail, a pair of rails, or also by a groove. The track can be a closed railroad, which can be traversed by the railbound vehicle numerous times one after another without changing direction, or the track can be an open railroad which can be traversed repeatedly by the railbound vehicle between the ends of the railroad always only after a change of direction.

Although in the present application the main emphasis is on the use of the winding arrangement in linear motor drive, the winding arrangement can also be used as part of a linear induction brake through deliberate shorting of its coils or its single conductor coil pairs as the case may be, where the winding arrangement in interaction with a magnet arrangement moving relative to it acts as a linear generator.

In order to make sure that the magnetic fields generated by the two coils of a single conductor coil pair when they carry current reinforce each other, when regarding the single conductor coil pair along its coil pair winding axis the one coil out of the first and second coil is wound in a winding direction from radial outside towards radially inside and the respective other coil is wound in the same winding direction from radially inside towards radially outside. Due to the opposite winding directions, when regarding the single conductor coil pair along the coil pair winding axis, of the first and second coil participating in forming the single conductor coil pair, the winding wire can be fed from the one coil from radially outside towards radially inside in the eye region of the one coil, where it can be connected electrically with the winding wire of the respective other coil in its eye region and fed through the through the other coil again from radially inside towards radially outside. Consequently, the two connecting sections of the single conductor coil pair advantageously both lie easily accessible radially outside, while the electroconductive connection between the first and the second coil can be made in the coil-pair eye region.

Preferably, the first and the second coil of the single conductor coil pair are arranged in such a way that when looking along the coil pair winding axis, their two sections that are orthogonal to the sequence axis overlap, and their two sections that are parallel to the sequence axis overlap. Advantageously, the first and the second coil of the single conductor coil pair are the same size, such that they contribute essentially in equal measure to the magnetic field generated by the single conductor coil pair. Consequently, the ohmic resistances of the two coils of the single conductor coil pair can also be configured to be approximately of the same size, such that the two coils of the single conductor coil pair when energized are under approximately the same thermal stress in quantitative terms.

Pursuant to this preferred embodiment, the production of a single conductor coil pair from a first and a second coil can be facilitated by configuring the first and the second coil of the single conductor coil pair identically and arranging them so as to be rotated by 180° relative to each other about an arrangement axis that is orthogonal both to the sequence axis and to the coil pair winding axis. That is to say, then it suffices to fabricate only one type of coil and combine every two coils in the aforementioned represented arrangement relative to each other into a single conductor coil pair. To facilitate the fabrication, the electroconductive connection of the first and the second coil in the coil-pair eye region is preferably a firmly bonded join connection, for instance by soldering, if desired by using a connecting sleeve that encloses the two radially inner ends of the first and the second coil. The connecting sleeve can be a material strip wound around the two radially inner ends of the first and the second coil or it can be a sheath pushed over the two radially inner ends of the first and the second coil.

It should however be pointed out that the electroconductive connection of the radially inner end regions of the first and the second coil does not have to be a firmly bonded join connection. The first and the second coil can also be formed from a single length of winding wire, which however renders more difficult the production of a single conductor coil pair compared with using separately made and subsequently joined coils.

Although the first and the second coil can be arbitrary types of coils, in order to make sure that there is adequate thermal robustness, i.e. the smallest possible ohmic resistance, with at the same time the smallest possible dimension along the coil winding axis and a low fabrication cost, it is preferable if the first and the second coil of the at least one single conductor coil pair are each coils with only one winding plane, preferably flat wire coils because of the achievable higher copper density. Preferably the first and the second coil each exhibit four straight coil sections, of which each two coil sections following each other immediately about the coil winding axes enclose an angle of 70° to 110°, preferably of 90°. Curved coil sections can be configured between straight coil sections, where preferably their radius of curvature decreases with decreasing distance from the coil eye region, in order to be able to arrange the copper of the winding wire of the respective coil as compactly as possible and as gap-free as possible.

In principle, the winding arrangement can be a single-phase winding arrangement, which is configured only for connecting to a single phase of an electrical power supply. In this case, all the coils and in particular all the single conductor coil arrangements of the single-phase winding arrangement are switched electrically in series. In order to generate the magnetic field which in a linear motor is desired to be temporally and spatially variable, however, it is advantageous if the winding arrangement for connecting to a power supply is configured with different electrical phases. Then the winding arrangement preferably contains a strand with coils switched electrically in series, in particular single conductor coil pairs, for each connectable electrical phase. This strand is also referred to hereunder as 'phase strand'. As already explained above, each such phase strand preferably comprises a plurality of single conductor coil pairs.

An advantageous arrangement of individual single conductor coil pairs, each assigned to a different electrical phase, can be obtained by the winding arrangement exhibiting at least three single conductor coil pairs following each other immediately along the sequence axis, of which every single conductor coil pair is assigned to a different phase than the two immediately adjacent single conductor coil pairs along the sequence axis between which the single conductor coil pair is arranged. Consequently, a magnetic field can be generated along the sequence axis that varies in fine steps from one single conductor coil pair to the next single conductor coil pair.

Due to the aggregation of coils, first and second coil, arranged adjacent to each other axially relative to their coil winding axes while forming a common coil-pair eye region, into a single conductor coil pair formed from a single conductive electrical conductor, considerable facilitation moreover results in the wiring of the individual single conductor coil pairs of the winding arrangement among themselves. In order to facilitate the wiring, for each strand connected to a different electrical phase, each with a plurality of single conductor coil pairs, it can be the case that from single conductor coil pairs connected with each other in a phase strand along the sequence axis and following each other directly, i.e. electrically directly without intermediate arrangement of further coils of the same phase, a radially outside lying connecting section of a preceding single conductor coil pair with a radially outside lying connecting section of a following single conductor coil pair is connected to a connecting conductor section that electroconductively connects the two single conductor coil pairs. Here the one connecting section is located in the layer region of a layer out of first and second layer and the respective other connecting section is located in the layer region of the respective other layer out of first and second layer. The connecting conductor section, which electroconductively connects two immediately consecutive single conductor coil pairs in a phase strand along the sequence axis, consequently always proceeds via the virtual separating surface between the first coil layer and the second coil layer. In contrast to the state of the art described above, in this way two single conductor coil pairs, i.e. four coils, can be connected electrically to each other with one connecting conductor section. This applies to a single-phase winding arrangement just as much as it does to a multiphase winding arrangement.

Since in the case of multiphase winding arrangements, i.e. those that are connectable to several electrical phases, connecting conductor sections cross each other, in order to provide the installation space needed for the crossing it is advantageous if the connecting conductor section proceeds away from each of the single conductor coil pairs connected by it in a different layer region than the respective single conductor coil pair and proceeds in a changeover section between the two layer regions located at a distance from the two single conductor coil pairs connected through the connecting conductor section. Thus the changeover from one coil layer into the respective other coil layer can take place only in the changeover section, which is arranged at a distance from the single conductor coil pairs concerned. The distance here is a distance orthogonally to the coil pair winding axes of the single conductor coil pairs connected through the connecting conductor section.

Preferably, the changeover sections can be located in a changeover region running along the sequence axis and arranged at a distance from the single conductor coil pairs. The dimension of the changeover region along the sequence axis is here its greatest dimension.

Preferably there lies between a coil section of the winding arrangement running along the sequence axis, in which all the coils are accommodated, and the changeover region, in which preferably all changeover sections are accommodated, a connection region, in which a connection section of the phase strand connecting the relevant changeover section with its directly connected single conductor coil pairs is arranged. For the sake of clearer arrangement, preferably no changeover section is arranged in the connection region. Preferably the connection section of the electrical conductor of the phase strand proceeds with a route component orthogonally to the single conductor coil axes and with a route component along the sequence axis. Likewise preferably the changeover section of the electrical conductor of the phase strand proceeds with a route component along the sequence axis and with a route component along the coil pair winding axes. Especially preferably, in order to facilitate their laying the aforementioned sections proceed respectively only with the aforementioned route components.

Preferably for the most collision-free laying possible of the connecting conductor sections, the changeover section of at least one connecting conductor section, preferably of all connecting conductor sections, extends away via the—relative to the sequence axis—axial longitudinal middle of the axial distance by which the single conductor coil pairs connected directly through the connecting conductor section are spaced from each other. The changeover section thus extends on both sides of the axial spacing longitudinal middle. Especially preferably, the changeover section extends equally spaced away from the spacing longitudinal middle on the two axial sides of the spacing longitudinal middle. Likewise it is advantageous for an advantageously collision free laying if the connection section proceeding from a single conductor coil pair to a changeover section proceeds in a straight line. Especially preferably, at least one connecting conductor section, preferably every connecting conductor section, is invariant under rotation by 180° about the axis of symmetry relative to an axis of symmetry orthogonal both to the sequence axis and to the coil pair winding axes. This means that the connecting conductor section does not differ from a connecting conductor section rotated by 180° about the axis of symmetry.

Preferably for protection against external effects, the at least one single conductor coil pair, especially preferably the entire winding arrangement, is accommodated in a coil housing. In order to be able to fix the coils of the winding arrangement, on which in operation considerable mechanical forces can act, as effectively as possible, according to an advantageous further development of the present invention an accommodating cavity can be configured in the coil housing for each single conductor coil pair out of a plurality of single conductor coil pairs. The respective assigned single conductor coil pair is then accommodated in the accommodating cavity. The accommodating cavity is preferably configured to be complementary to the single conductor coil pair accommodated by it, such that walls of the accommodating cavity follow a respectively opposite to them external surface section of the accommodated single conductor coil pairs gap-free or with a small clearance of preferably less than 1 mm. Thermal expansion of the coils in operation can be taken into account through the provision of a clearance. The reference state of the winding arrangement is an unenergized state at a room temperature of 20° C.

In order to facilitate the assembly, the coil housing can comprise two housing components. The two housing components form, connected to each other, the coil housing. Assembly experiments have shown that for effective, as error-free as possible, and simple assembly, it is preferable if of each accommodating cavity one part is configured as a recess in the one housing component and another part as a recess in the other housing component, where the two parts configured in different housing components of one and the same accommodating cavity preferably differ in size. Thus, a single conductor coil pair can be inserted in the larger recess of the one housing component and projects from this recess along the coil pair winding axis, such that the single conductor coil pair inserted in the larger of the two recesses forming the accommodating cavity also remains accessible and manipulable for the installer. Furthermore, in this way a coil housing with higher stability is obtained than where one housing component would cover the respective other one only as an unprofiled cover.

By also configuring a recess that contributes to forming the accommodating cavity in the other housing component, its arrangement relative to a housing component with inserted single conductor coil pairs is readily discernible and normally possible only in a single orientation, which further reduces the risk of error in the assembly.

Advantageously, the recesses reach from the joint plane of the housing components of the coil housing, which is common to them in the connected state, to different depths within the two housing components. For the sake of simplicity, the aforementioned joint plane is preferably oriented orthogonally to the parallel coil pair winding axes. The depth of the larger of the two recesses forming an accommodating cavity is therefore preferably larger than the thickness of a coil, selected out of first and second coil, but smaller than the thickness of the single conductor coil pair formed from these coils.

The housing components can for example be manufactured by the injection molding process, where a fiber-reinforced thermoplastic synthetic material can be processed through injection molding in order to increase the components' strength. Likewise, the housing components can be manufactured by an additive fabrication process, such as e.g. 3D printing.

To achieve especially mechanically strong housing components, a fiber-reinforced, preferably glass fiber-reinforced, thermosetting material can be used, where the recesses in the housing components can be machined in. The strength of the thermosetting material does not change under the heating to be expected during the winding arrangement's operation or at least significantly less than a thermoplastic.

The two housing components can be connected with each other while having an intermediate arrangement of a seal surrounding all the coils accommodated in the coil housing. The region surrounded by the seal can in addition also comprise the connecting conductor sections. The seal can be inserted between the housing components as a solid seal or applied as a viscous seal to at least one housing component in the form of a sealing bead. Preferably the viscous seal hardens elastically after its application, in particular after the fitting of the housing components to the coil housing. Preferably a seal cavity for accommodating the seal is configured in at least one housing component, preferably in both housing components. The seal cavity too, like the accommodating cavity, can project to a different depth into each of the two housing components.

As already mentioned above, the coil housing can exhibit a coil region in which the accommodating cavities that accommodate the single conductor coil pairs are arranged. The coil housing can further exhibit a connection area adjacent to the coil region, in which the connecting conductor sections are arranged. The connection area can exhibit the aforementioned connection region and the aforementioned changeover region. So that the coil region is easily accessible with the smallest possible air gap for the magnet arrangement or inductive arrangement interacting with it, preferably all the accommodating cavities are located on the same side of the connection area.

Since normally only the coil region interacts with the magnet arrangement or the inductive arrangement of the linear motor, in order to achieve the smallest possible air gap the coil region can be configured with a smaller thickness than the connection area. As already stated above, the thickness should be measured along the coil winding axes or the coil pair winding axis respectively.

The winding arrangement being discussed here too, can be cooled actively with a fluid cooling medium under forced convection, in order to dissipate heat from the winding arrangement and thereby be able to subject the winding arrangement to a higher electrical power. For this purpose there can be configured in the coil housing at least one cooling duct, into which at least one section of each single conductor coil pair out of the number of single conductor coil pairs projects, such that the projecting sections are wettable by a cooling medium flowing through the cooling duct. As a result, the single conductor coil pairs can transfer heat directly to the cooling medium flowing through the cooling duct. Such cooling of the single conductor coil pairs requires no enlargement or only a negligible enlargement of the thickness dimension of the coil region of the winding arrangement.

Although in principle the cooling duct can be configured as a duct in the coil housing separate from the rest of the recesses in housing components, nevertheless in order to reduce the cost needed for manufacturing the coil housing it is advantageous if the accommodating cavities form a section of at least one cooling duct. Preferably, each accommodating cavity in which a single conductor coil pair is accommodated is a section of a cooling duct through which cooling medium can flow.

In order to be able to supply a plurality of accommodating cavities successively with the cooling medium, the number of accommodating cavities can be connected with each other via a flow duct through which the cooling medium can flow from one accommodating cavity into a cavity next along the sequence axis. Hence it can suffice to introduce cooling medium into the coil housing at a longitudinal end of it that is axial relative to the sequence axis and discharge it at the opposite axial longitudinal end at a higher temperature.

Preferably the accommodating cavity is annular. The coil-pair eye region can accommodate the radial inner coil ends that are connected with each other of the first and the second coil and otherwise be filled with material of the coil housing or with a ferromagnetic core material, such that for the accommodation of the single conductor coil pairs there essentially remains an annular space that surrounds the filling of the eye region.

The supply of the cooling medium into the accommodating cavity preferably takes place from the aforementioned connection area. In order to make sure that the cooling medium flowing through the accommodating cavity wets the largest possible area of the single conductor coil pair inserted into the accommodating cavity and in order to prevent a fluid mechanical short circuit between a feeding and a discharging flow duct, a single conductor coil pair can only be firmly bonded locally with a wall of the annular accommodating cavity accommodating it in such a way that the firmly bonded connection allows flow of cooling medium from a flow duct feeding cooling medium to the accommodating cavity to a flow duct discharging cooling medium from the accommodating cavity in only one direction of flow along the annular accommodating cavity. The firmly bonded connection can for example be achieved through cementing or local molding. Thus for example the firmly bonded connection can interrupt the shorter of two possible connecting routes between a feeding and a discharging flow duct, such that the cooling medium flowing through the accommodating cavity always flows along the longest possible flow route between the feed and discharge of the cooling medium into the accommodating cavity or out of it respectively.

Not only single conductor coil pairs can be accommodated in a respectively assigned accommodating cavity, but also the connecting conductor sections can be accommodated in conductor cavities specifically configured therefor in the coil housing. These conductor cavities are in turn preferably configured as complementary to the connecting conductor sections accommodating them, such that the course of the conductor cavities essentially corresponds to the course of the connecting conductor sections accommodated inside. Preferably the conductor cavities can be part of the flow duct in order to reduce the fabrication cost. Then in a preferred further development of the present invention, there is accommodated in the flow duct that connects accommodating cavities with each other at least one connecting conductor section, preferably a plurality of connecting conductor sections. Since the connecting conductor sections in any case run between two single conductor coil pairs, the conductor cavities accommodating them run between two accommodating cavities and connect these fluid-mechanically. Preferably, several cooling ducts supplied with cooling medium are then configured in the coil housing, especially preferably the number of cooling ducts corresponds to the number of electrical phases to which the winding arrangement is connectable. Most preferably, for each phase strand there is configured its own cooling duct.

The coil housing can exhibit mounting formations, by means of which the coil housing is connectable with a supporting structure. The supporting structure is preferably also a supporting structure of the track of the railbound vehicle driven and preferably also braked by using the winding arrangement. The construction of the winding arrangement and of the coil housing surrounding it described above, permits an advantageous configuration of the mounting formations as through-holes penetrating through the coil housing in the thickness direction. These through-holes too, can in the manner described above be sealed in a simple way by means of an intermediate arrangement of a seal between the housing components. The connection of the coil housing with the supporting structure is preferably a detachable connection, for example by means of bolts or bolts and nuts.

The laying of the connecting conductor sections described above makes possible the formation of regions in the connection area that are completely free from electrical functional components, such that preferably the at least one part of the mounting formations is arranged and/or configured in the connection area.

If at least some of the mounting formations comprise through-holes that penetrate through the coil housing, each of the through-holes can be arranged in a window region within the connection area surrounded by connecting conductor sections. Such a window region is a region free from electrical functional components.

Likewise, a region of the coil housing free from electrical conductors of the coils and the connecting conductor sections connecting them can be configured to accommodate at least one sensor. For example, at least one sensor recess can be configured in the coil housing to accommodate a sensor, such as for instance a temperature sensor. Preferably the sensor recess is also located in the connection area. A signal transmission line, which links the sensor with a control device, can be laid in a separate signal conductor cavity in the coil housing, in particular in its connection area. The signal conductor cavity can be section-wise identical with an aforementioned conductor cavity for accommodating the connecting conductor sections, such that section-wise the signal transmission line of a sensor and a connecting conductor section are laid in one and the same cavity in the coil housing. Section-wise, in particular in the connection region of the coil housing, the signal conductor cavity can be provided outside the first and the second layer of the coils, in order to prevent clashes with the connecting conductor sections.

Knowing the position of the magnet arrangement or inductive arrangement respectively moving relative to the winding arrangement or generally of the vehicle moving relative to the winding arrangement is advantageous for precisely controlling the magnetic field generated by the winding arrangement. First and foremost, knowing the position immediately before an overlapping of magnet arrangement or inductive arrangement respectively on the one hand and winding arrangement on the other is advantageous in order to be able to control the magnetic field of the winding arrangement so as to match as closely as possible the motion of the magnet arrangement or inductive arrangement respectively. Preferably, therefore, the winding arrangement comprises a probe for acquiring a position and/or motion of a magnet arrangement or inductive arrangement respectively that interacts with the winding arrangement in linear motor fashion. Preferably the winding arrangement comprises a probe housing in which the probe is accommodated and which is connected with the coil housing. Since the winding arrangement is preferably designed for use in synchronous linear motors, which use a magnet arrangement that exhibits a plurality of permanent magnets as a linear motor component which interacts with the winding arrangement, the probe is preferably a magnetic field-sensitive probe, for instance a Hall probe.

The term 'probe' means the same here as the term 'sensor' and is used merely for linguistic differentiation from the aforementioned sensor in the interior of the coil housing for determining operating parameters, such as for example the temperature, of the winding arrangement.

In principle the probe housing can be configured as bonded integrally with the coil housing. Since, however, several winding arrangements can also be arranged one after another in the direction of the sequence axis, of which only the frontmost winding arrangement in the relative motion direction of the magnet arrangement or inductive arrangement respectively and thereby the first reached requires a position probe, the probe housing is preferably connected as per intended use detachably with the coil housing.

For mechanically especially secure and durable detachable connection of the probe housing with the coil housing, fastening formations can be configured at the probe housing which for connecting the coil housing and probe housing can be made to engage with fastening counter-formations configured at the coil housing. The engaging is preferably positive engaging. A formation made of fastening formation and fastening counter-formation can be a projection which engages with a recess, preferably complementary configuration, of the respectively other formation. In order to avoid unnecessary projecting component sections at the coil housing when no probe housing is needed at the coil housing, preferably the fastening formations are projections and the fastening counter-formations are recesses.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
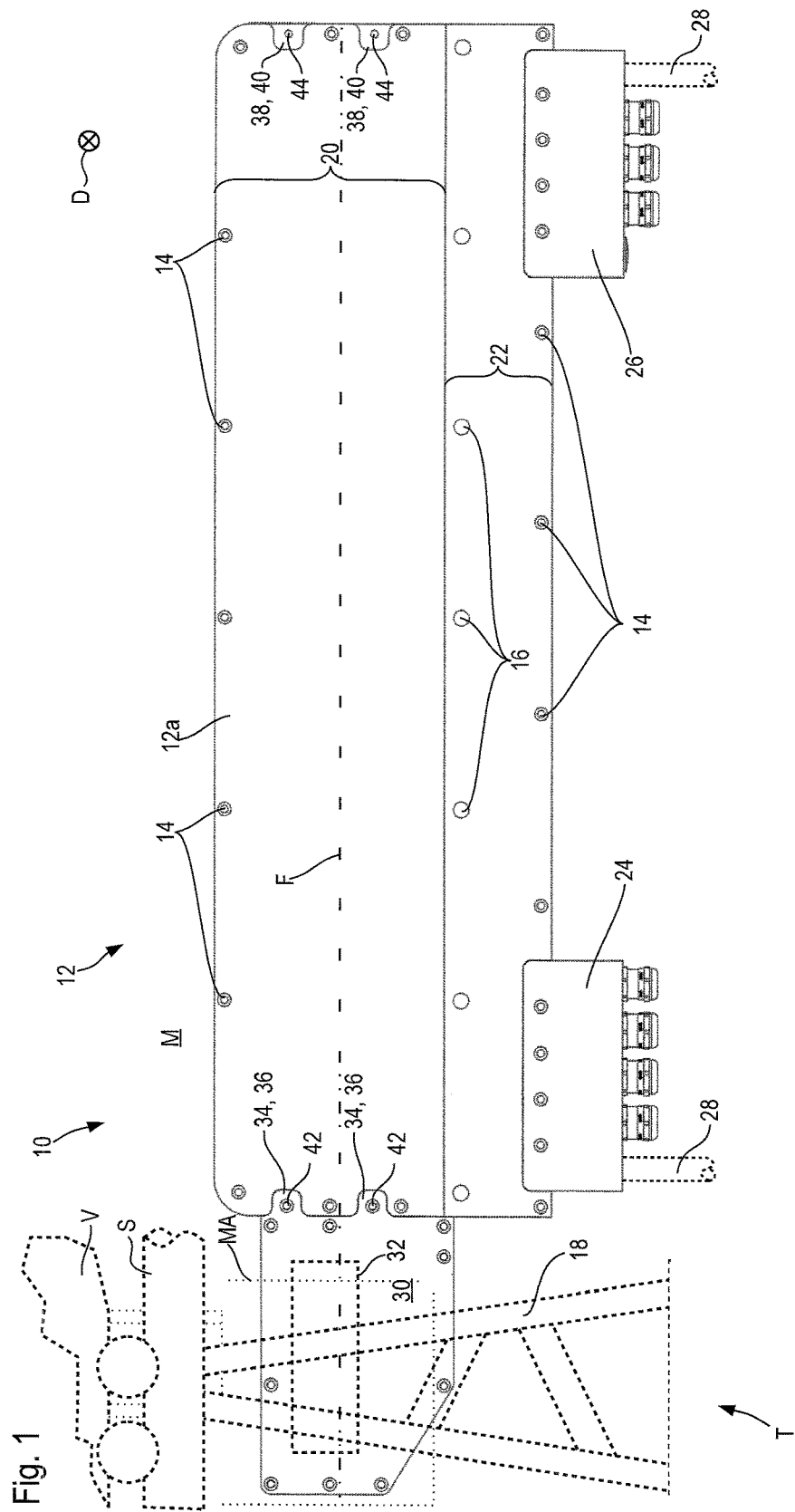
FIG. 1 A top view of a linear motor stator with a coil housing with a winding arrangement according to the invention accommodated therein, FIG. 2 The stator of FIG. 1 without a probe housing connected with it, but mounted on a supporting structure, FIG. 3 A cross-sectional view through the stator of FIG. 2 along the sectional plane III-III of FIG. 2, FIG. 4 The stator of FIGS. 1 to 3 with removed first housing component, FIG. 5 A second embodiment of the stator of FIG. 4 with several cooling ducts and with flow ducts accommodating connecting conductor sections, and FIG. 6 A third embodiment of the stator of FIG. 4 without cooling duct, but with sensors accommodated at the coil housing.

Referring now to the drawings wherein the showings are for the purpose of illustrating preferred and alternative embodiments of the invention only and not for the purpose of limiting the same, FIG. 1 shows a linear motor stator 10 in a top view with the direction of view along coil winding axes of conductive coils accommodated in the coil housing 12 and therefore not depicted in FIG. 1. The coil winding axes run orthogonally to the drawing plane of FIG. 1. A sequence axis F along which the individual coils are arranged as interconnected single conductor coil pairs following each other, runs parallel to the drawing plane of FIG. 1.

Figure 2:
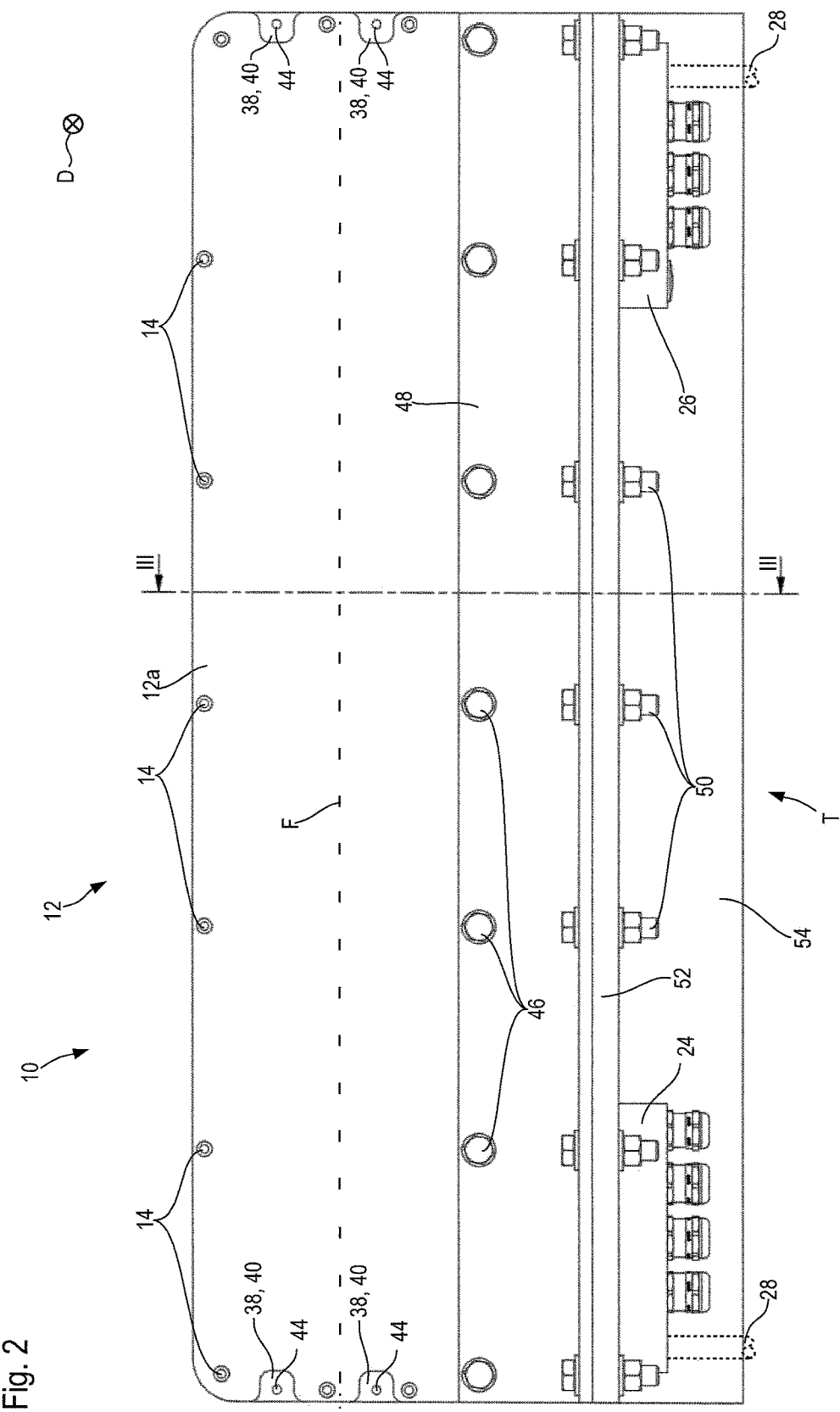

The coil housing 12, which for reasons of the achievable high mechanical and thermal robustness is preferably formed from a glass-fiber fabric reinforced thermoplastic, for instance an epoxy resin, comprises two housing components, of which the observer of FIGS. 1 and 2 is looking at the smaller first housing component 12a which is the frontmost in the viewing direction, which masks the larger second housing component 12b lying behind it in FIGS. 1 and 2 (see FIGS. 3 to 6).

A large number of through-holes 14 are configured along the margin of the coil housing 12, which complete penetrate through the coil housing 12 and accommodate fasteners, such as for instance bolt-nut combinations, in order to connect the two housing components 12a and 12b securely and preferably as per intended use detachably with each other. For the sake of improved clarity, only some of the through-holes 14 are provided with reference labels.

In the coil housing 12, following each other equidistantly along the sequence axis F, a plurality of mounting holes 16 are configured as mounting formations, which likewise completely penetrate through the coil housing 12 in the thickness direction D which is orthogonal to the drawing plane of FIG. 1 and thus parallel to the coil winding axes. The mounting holes 16, of which likewise for improved clarity only three out of seven are provided with reference labels, serve for fastening the coil housing 12 and/or the stator 10 respectively to a supporting structure T which is indicated only by a dashed line, for example a framework 18, which carries a rail arrangement S for guiding a rail-bound vehicle V.

The vehicle V moves along the sequence axis F past the stator 10. Normally the vehicle V carries along a magnet arrangement MA, which exhibits a plurality of permanent magnets with alternating polarization following each other along the sequence axis F. Such a magnet arrangement MA forms together with the stator 10 a synchronous linear motor. The vehicle V is preferably a car or a train consisting of several cars of a fairground ride, such as for example a rollercoaster.

The coil housing 12 exhibits a coil region 20 in which the coils are arranged, and exhibits adjacent to the coil region 20 a connection area 22 in which the electrical conductor sections connecting the individual coils are accommodated. Since the magnet arrangement MA of the vehicle V interacts in force-generating fashion only with the coils in the coil region 20, to achieve the smallest possible air gap the coil region 20 is configured with smaller thickness than the connection area 22, whose thickness dimension matters less. Preferably inter alia, due to the greater thickness of the connection area 22 and the associated higher robustness of this component section, the mounting holes 16 are arranged in the connection area 22.

The coils in the interior of the coil housing can be supplied with electric power via junction boxes 24 and 26 located at the longitudinal side's end. As an example, in the present case the stator 10 is a three-phaser stator, which is supplied with three-phase current. The three-phase current is regulated, for controlling the driving force generated by the stator 10 through interaction with the magnet arrangement MA, by a non-depicted frequency converter in a manner that is known per se.

At the junction box 24 shown on the left in FIG. 1 there is provided, in addition to the three access points for one electrical phase each, a further access point for signal transmission lines, which can lead to sensors that are accommodated in the coil housing 12. At both junction boxes 24 and 26 there is furthermore still room for a cooling medium line 28 indicated only by a dashed line, in order to feed cooling medium into the interior of coil housing 12 and discharge it again from coil housing 12 and thereby cool convectively coils accommodated in the coil housing 12.

At the left axial (relative to the sequence axis F) longitudinal end in FIG. 1 there is mounted on the coil housing 12 detachably as per intended use a probe housing 30, for instance by means of bolt-nut combinations. In the probe housing 30 there is accommodated in the depicted example a magnetic field-sensitive probe 32, for instance a Hall probe, which acquires the magnetic field of the magnet arrangement MA carried along by the vehicle V, determines from it the current position of the vehicle along the rail arrangement S, and transmits it via a signal transmission line to a non-depicted control device. The control device controls, having regard to the vehicle position determined by the probe 32, the frequency converter that energizes the coils in the coil housing 12.

For simple but secure connection with the coil housing 12, the probe housing 30 exhibits protruding projections 34 as fastening formations 36, which engage positively with recesses 38 as fastening counter-formations 40 in the coil housing 12. The fastening counter-formations 40 configured as recesses 38 are recognizable at the right axial longitudinal end of the coil housing 12 in FIG. 1, at which no probe housing 30 is mounted.

The fastening formations 36 are respectively provided opposite each other pairwise in the thickness direction D at the probe housing 30, where the section of the coil housing 12 lying in the thickness direction between the fastening counter-formations 40 is arranged between the fastening formations 36. The probe housing 30 therefore surrounds with the fastening formations 36 a section of the coil housing 12 in the form of a fork. The shapes of the fastening formations 36 and fastening counter-formations 40 are configured as complementary to each other, such that with the establishment of the positive engagement between the fastening formations 36 and the fastening counter-formations 40, the relative position of the probe housing 30 relative to the coil housing 12 is also essentially fixed. Fastening apertures 42 in the fastening formations 36 as well as fastening apertures 44 in the fastening counter-formations 40 align with each other after establishment of the positive engagement between the fastening formations 36 and the fastening counter-formations 40, such that the fastening formations 36 can be secured to the fastening counter-formations 40 by means of fasteners detachable as per intended use, such as for example bolt-nut combinations.

Figure 3:
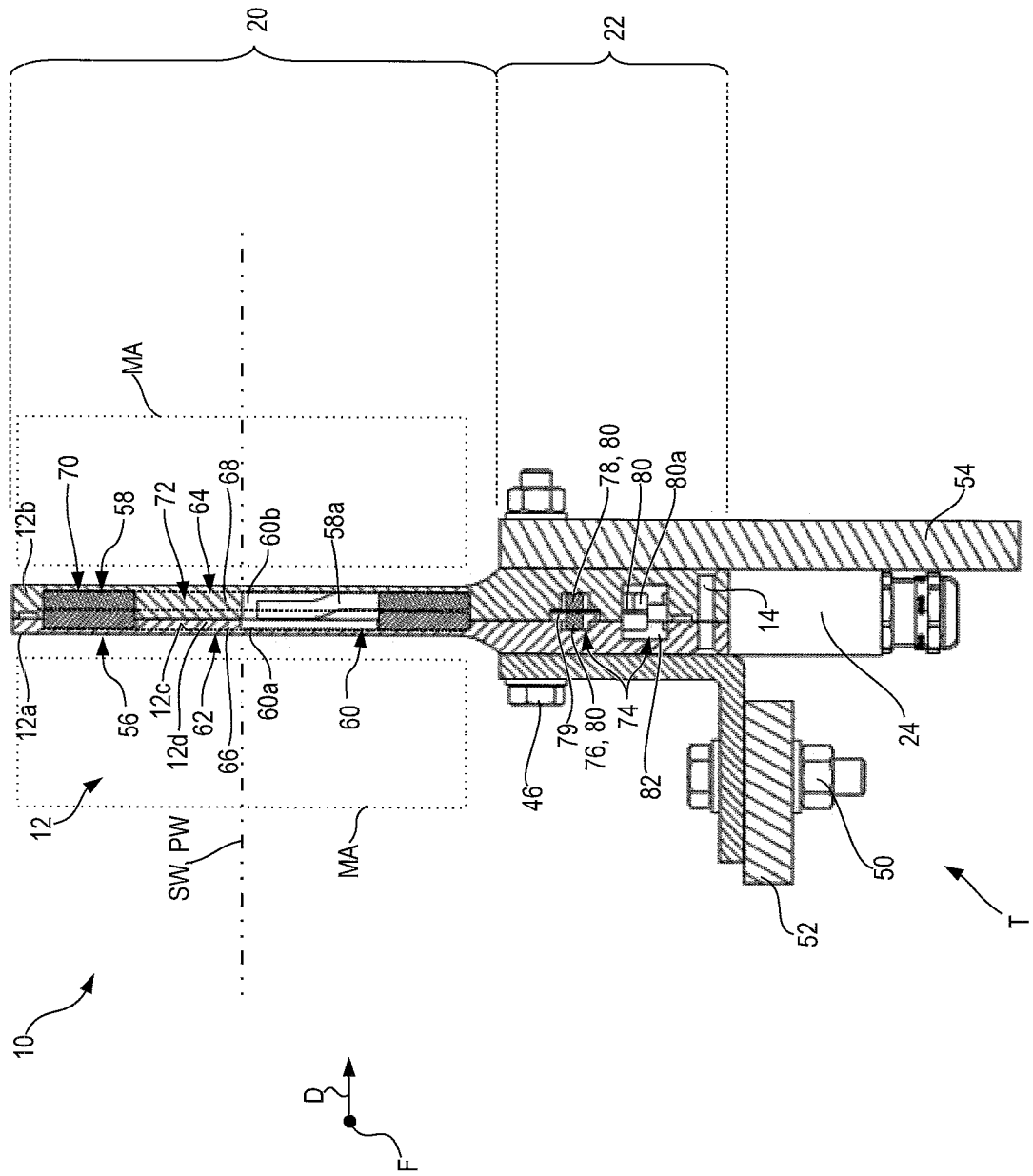

In FIGS. 2 and 3, the stator 10 is depicted mounted on the supporting structure T without probe housing 30. FIG. 3 is a cross-sectional view of the stator 10 along the plane III-III in FIG. 2.

On the side of the first housing component 12a, the stator 10 is attached to an angle section 48 with a plurality of bolt-nut combinations 46, of which the bolts penetrate through the mounting holes 16. The angle section 48 in turn is mounted with a plurality of bolt-nut combinations 50 on a further supporting body 52.

On the side of the second housing component 12b, the stator 10 is mounted on a flat section 54 with the number of bolt-nut combinations 46. Preferably the angle section 48, the supporting body 52, and the flat section 54 are steel components, where other materials should not be ruled out either.

As can be discerned in FIG. 3, in the coil region 20 with a smaller thickness dimension in the thickness direction D there are accommodated in the coil housing 12 a first coil 56 located nearer to the first housing component 12a and a second coil 58 located nearer to the larger second housing component 12b. The coil housing 12 exhibits for this purpose an accommodating cavity 60, in which the first coil 56 and the second coil 58 are accommodated.

On energizing the coils 56 and 58, they generate in their neighborhood in a manner known per se a temporally and spatially varying magnetic field M.

The accommodating cavity 60 is to a larger part configured in the second housing component 12b and only to a smaller part in the first housing component 12a, which facilitates the assembly of the stator 10. The accommodating cavity 60 is configured centrally in the coil housing 12 in the thickness direction, whereas the joint plane 12c of the first and of the second housing component 12a and 12b respectively is arranged displaced in the thickness direction from the center of the coil housing 12. The second coil 58 is therefore completely accommodated in the recess 60b in the second housing component 12b which contributes to forming the accommodating cavity 60, whereas the first coil 56 is accommodated to one part in the recess 60b and to another part in the recess 60a of the first housing component 12a which contributes to forming the accommodating cavity 60. Thus the coils 56 and 58 can initially be arranged in the second housing component 12b, and once arranged be maneuvered. The assembly of the first housing component 12a with the second housing component 12b completes the two recesses 60a and 60b for making the accommodating cavity 60 and fixes the two coils 56 and 58 in the coil housing 12.

The first coil 56 and the second coil 58 are wound around virtual collinear coil winding axes SW and are overlaid almost completely along the common coil winding axes SW. Every coil 56 and 58 exhibits in its radially inner region an eye region 62 or 64 respectively free from coil turns. The sectional plane III-III penetrates centrally through the first and the second coil 56 or 58 respectively in such a way that the coil winding axes SW conceived as penetrating centrally through the eye regions 62 and 64 are located in the sectional plane III-III.

The stator 10 exhibits along the sequence axis F several first coils 56 arranged one after the other, which are arranged in a common first coil layer 66. Likewise the stator 10 exhibits along the sequence axis F one after another arranged several second coils 58, which are arranged in a common second coil layer 68. The two coil layers 66 and 68 are directly adjacent to each other along the coil winding axes SW.

The first and the second coil 56 and 58 respectively in their radially inner marginal region, more precisely in the common eye region 62 and 64 with their radially inner longitudinal ends 56a (see FIG. 4; the longitudinal end 56a is located in FIG. 3 immediately before the sectional plane III-III) and 58a respectively, are electroconductively connected such that the first coil 56 and the second coil 58 form a single conductor coil pair 70 formed from an electrically uninterruptedly conducting electrical conductor. The virtual coil pair winding axis PW, which is conceived as centrally penetrating through the coil-pair eye region 72 formed by the eye regions 62 and 64, is collinear with the coil winding axes SW.

In the connection area 22, the sectional plane III-III intersects regions of a connecting cavity 74 that are located away from each other in the sectional plane III-III.

In the upper region there run two electrical conductors 76 and 78 of different connecting conductor sections 80, which connect in the coil housing 12 single conductor coil pairs 70 arranged along the sequence axis F at a distance from each other and belonging to the same electrical phase, of which no connecting conductor section 80 is connected with the intersected single conductor coil pair 70. The electrical conductors 76 and 78, which in the sectional plane III-III next to each other in the thickness direction D, are isolated electrically from each other by an electrically insulating material layer 79 arranged between them.

In the lower region of the connecting cavity 74 there can be seen a changeover section 80a of a connecting conductor section 80 located behind the sectional plane III-III.

Also shown by a dotted line is the magnet arrangement MA, which exhibits two part-magnet arrangements arranged at a distance from each other, where during the travel mode of the vehicle V, when viewed in a vehicle-fixed coordinate system, the stator 10 moves through the gap formed between the part-magnet arrangements.

Figure 4:
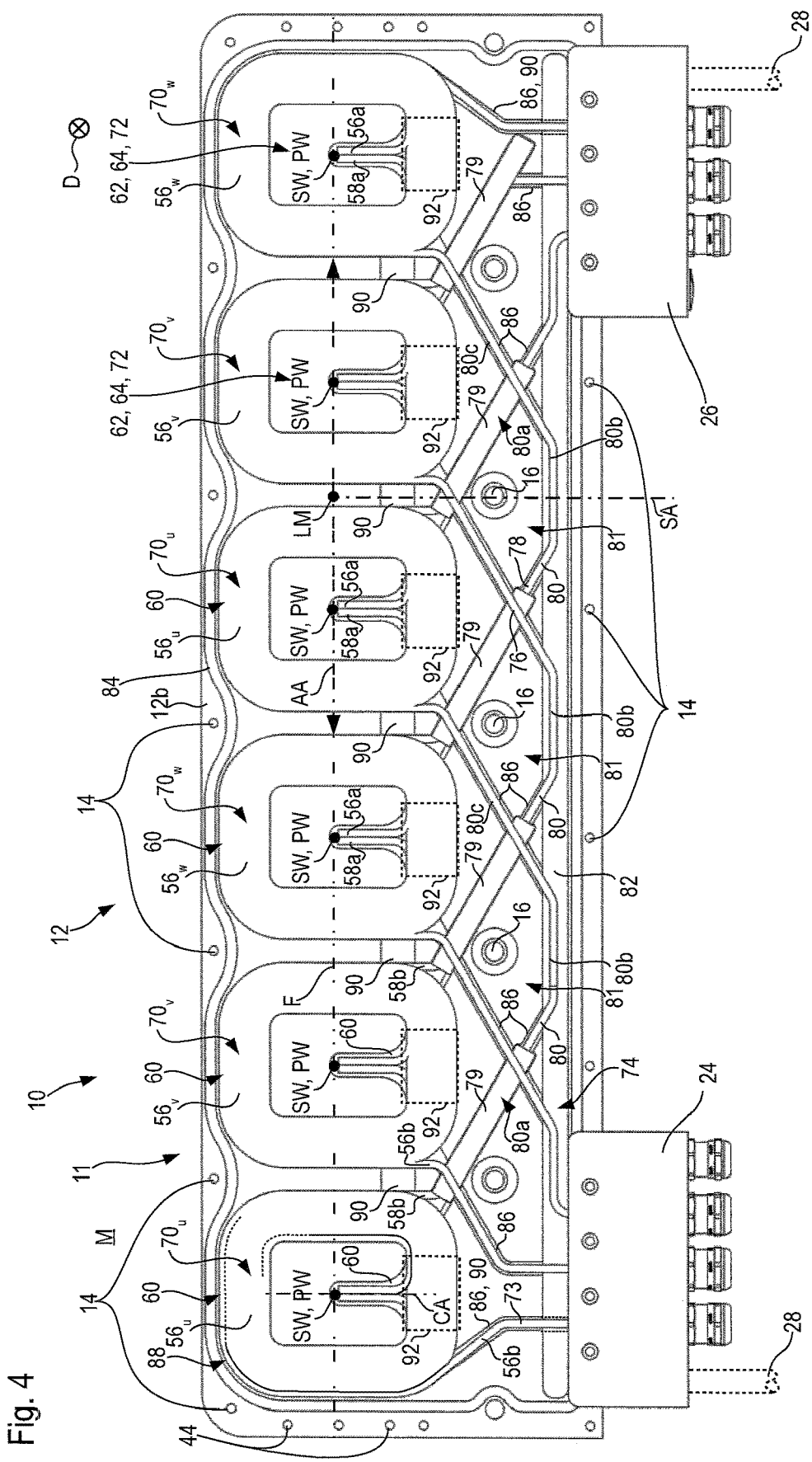

FIG. 4 shows the stator 10 of FIGS. 1 to 3 in the perspective of FIG. 2, but with removed first housing component 12a. In this way, the winding arrangement 11 of the stator 10 is discernible with six single conductor coil pairs 70 as an example.

The winding arrangement 11 is a three-phase winding arrangement 11, which is connectable to three electrical phases u, v, and w of a three-phase current supply. The three-phase configuration is merely an example. In order to distinguish the connection-based assignment of the individual single conductor coil pairs 70 to the individual electrical phases, the electrical phases as added as an index to the reference label 70 of the single conductor coil pairs. As can be discerned in FIG. 4, along the sequence axis F no two single conductor coil pairs 70 assigned to the same electrical phase are adjacent to each other. Of arbitrarily selected three single conductor coil pairs 70 following each other immediately along the sequence axis F, the middle single conductor coil pair is always assigned to a different electrical phase than the single conductor coil pair preceding it along the sequence axis F and the one following it along the sequence axis F. For that matter, this would also apply had the winding arrangement 11 been configured only as two-phase.

The observer of FIG. 4 looks, when viewing the single conductor coil pairs 70, along the coil pair winding axis PW. In every case, only the first coil 56 in the first coil layer 66, which almost completely masks the second coil 58 of the respective single conductor coil pairs 70 in the second coil layer 68, can be discerned. Only the radially inner longitudinal ends 58a of the second coils 58 are discernible next to the radially inner longitudinal ends 56a of the first coils 56, likewise the radially outer connecting sections 58b leading away from the second coils 58. Radially outer connecting sections 56b of the first coils 56 form, in the example shown, the supply line for electric current to the first coil 56. For the sake of clarity, only the connecting sections 56b and 58b for the two single conductor coil pairs 70 on the left are labeled.

As is indicated in FIG. 4 at the left-most single conductor coil pair 70, in the viewing direction of FIG. 4 the first coil 56 is wound clockwise from radially outside to radially inside up to the radially inner end 56a. In the same viewing direction, the second coil 58 located behind the first coil 56 is wound clockwise from radially inside to radially outside. In fact, the first coil 56 and the second coil 58 of every single conductor coil pair 70 are made identically and merely arranged so as to be rotated relative to each other by 180° about a modification axis CA which is orthogonal both to the sequence axis F and to the coil pair winding axis PW, which in the depicted example corresponds to the coil winding axes SW. In this way, a single design of coils, which merely have to be oriented appropriately relative to each other, is sufficient for fabricating the winding arrangement 11.

Single conductor coil pairs 70 of the same electrical phase are respectively connected to each other electroconductively via a connecting conductor section 80. This is elucidated by means of the example of the phase u: the single conductor coil pair $70_u$, left-most in FIG. 4, is connected via the connecting section 56b through the junction box 24 with an electric power source, for instance a frequency converter. The connecting section 56b is present, like the entire first coil $56_u$, only in the first coil layer 66 (see FIG. 3).

By means of the connection of the radially inner longitudinal ends 56a and 58a with each other, the connecting section 56b of the first coil $56_u$ is connected via a single electrical conductor with the connecting section 58b of the second coil $58_u$, whereby the connecting section 58b too, like the second coil $58_u$, is located only in the second coil layer 68.

The connecting section 58b of the left-most single conductor coil pair $70_u$ is part of a connecting conductor section 80, which to begin with proceeds with a connection section 80a in the second coil layer 68 in a changeover region 82 of the connecting cavity 74, where a changeover section 80b of the connecting conductor sections 80 runs from the second coil layer 68 into the first coil layer 66 and from there runs in a further connection section 80c as connecting section 56b to the fourth single conductor coil pair 70, that is to say from left to right the second single conductor coil pair $70_u$. Once again, for the sake of clarity not all connection sections 80a and 80c in FIG. 4 are provided with reference labels. The connecting conductor sections 80 are essentially constructed identically.

As is shown in FIG. 1, for the sake of clarity only for the phase w, the changeover sections 82 of all connecting conductor sections 80 extend across the—relative to the sequence axis F—axial longitudinal middle LM of the axial distance AA, which the single conductor coil pairs 70 connected directly through the respective connecting conductor sections 80 have from each other. The changeover sections 82 extend on both axial sides of the distance longitudinal middle LM, especially preferably equally far away from the distance longitudinal middle LM. The connection sections 80a and 80c running from the single conductor coil pairs 70 of a phase to the changeover sections 82 connecting them run in straight lines. The connecting conductor sections 80, relative to an axis of symmetry SA orthogonal both to the sequence axis F and to the coil pair winding axes PW and running through the distance longitudinal middle LM, are invariant under 180° rotation about the axis of symmetry SA. Every connecting conductor section 80, therefore, is mapped to itself through 180° rotation about the axis of symmetry.

Should further single conductor coil pairs 70 of the phase u be present, they would be connected electrically in series in an analogous manner via further connecting conductor sections 80 to the already described single conductor coil pairs. In FIG. 4, however, the connecting section 58b of the fourth single conductor coil pair 70 from the left is connected again to the electric power supply via the junction box 26.

For the strands of the respectively other electrical phases v and w, the discussion concerning the electrical phase u applies analogously. Their connecting conductor sections 80 are configured in the same way as the connecting conductor section 80 of the electrical phase u.

The connecting sections 56*b* of the first coils 56 and the connection sections 80*a* of the connecting conductor sections 80 respectively have a route component respectively along the sequence axis F and also along the modification axis CA. The same applies to the connecting sections 58*b* of the second coils 58 and the connection sections 80*c* of the connecting conductor sections 80 respectively, where within a connecting conductor section 80 the inclination of the connecting sections 56*b* and 58*b* and of the connection sections 80*a* and 80*c* respectively relative to the sequence axis F about an axis of inclination orthogonal to the coil pair winding axis PW has the same magnitude but the opposite direction. Preferably the connection sections 80*c* of the connecting conductor sections 80 exhibit only the aforementioned route components.

In contrast to the connection sections 80*a* and 80*c* of a connecting conductor section 80, the changeover sections 80*b* run, preferably only, at an inclination about an axis of inclination parallel to the modification axes CA, in order to effect the changeover between the first coil layer 66 and the second coil layer 68.

As FIG. 4 shows, the mounting apertures 16 are formed in window regions 81, which respectively are formed by intersecting connecting conductor sections 80 of the three different electrical phases or phase strands respectively. Thus the mounting of the stator 10 on a supporting structure T can take place on the one hand at a sufficient distance from the single conductor coil pairs 70, and on the other, at a sufficient distance from the margin of the coil housing 12, such that without further aids and solely by means of the mounting aperture in 16 a very strong connection with a supporting structure T is achievable.

The second housing component 12*b* exhibits a circumferential accommodating groove 84 for accommodating a seal which seals the winding arrangement 11 radially towards the outside against the joint gap 12*d* of the housing components 12*a* and 12*b*. A seal accommodated in the accommodating groove 84 can be a solid seal which is inserted in the accommodating groove 84, or it can be a viscous seal which is applied as a viscous sealing bead into the accommodating groove 84 and then hardens in it.

The connecting cavity 74 exhibits conductor cavities 86, in which the connecting sections 56*b* and 58*b* are accommodated. In order to minimize a strength decrease of the coil housing 12, the conductor cavities 86 are configured with a small gap dimension of at most 1 mm complementarily to the electrical conductors 73, 76, and 78 accommodated in it, which also form the conductor strands of the electrical phases u, v, and w.

A cooling duct 88 can be configured in the coil housing 12, of which the accommodating cavities 60 form a part, such that cooling medium can flow in a gap space between the walls bordering the accommodating cavities 60 and the single conductor coil pairs 70 accommodated in the accommodating cavities 60. Thereby, resistive heat can be directly conducted away from the single conductor coil pairs 70 by the cooling medium.

The cooling medium can flow through flow ducts 90 from an accommodating cavity 60 to the accommodating cavity 60 immediately adjacent along the sequence axis F.

The cooling medium can be fed in via the cooling medium line 28 through a junction box 24 or 26 and discharged from the coil housing 12 through the respective other junction box. It shall be assumed below that the cooling medium is fed in through the cooling medium line 28 of junction box 24 on the left in FIG. 4 and discharged via the cooling medium line 28 of junction box 26 on the right.

The left-most conductor cavity 86 in FIG. 4 can be part of the cooling duct 88. Through these conductor cavities 86, therefore, gaseous or fluid cooling medium or as a biphasic flow, can reach the left-most accommodating cavity 60 in FIG. 4.

In order to make sure that cooling medium introduced into the accommodating cavity 60 does not flow to the next flow duct 90 along the shortest route and in order thereby to design the area of each single conductor coil pair 70 wetted by the cooling medium to be as large as possible, the single conductor coil pairs 70 can respectively be bonded only locally in a region 92 to their surrounding walls of the accommodating cavity 60 without any breaks or gaps by means of adhesive or casting compound. For one thing, in this way the single conductor coil pairs 70 are additionally fixed firmly in their respective accommodating cavity 60. For another, as a result the shorter connecting paths between a feeding conductor cavity 86 and a flow duct 90 or between a supplying and a discharging flow duct 90 or between a feeding flow duct 90 and a draining conductor cavity 86 are hydraulically blocked, such that when flowing through the accommodating cavities 60, only the longer route between the supply and the discharge lines, around the coil-pair eye region 72, is available to the cooling medium as a flow path.

In this way the cooling medium can flow through the coil housing 12, where according to this solution the accommodating cavities 60 following each other along the sequence axis F have cooling medium flowing through them individually one after the other, which consequently heats up more and more along the sequence axis F such that with flow from left to right the convective heat transport decreases along the direction of flow.

Figure 5:
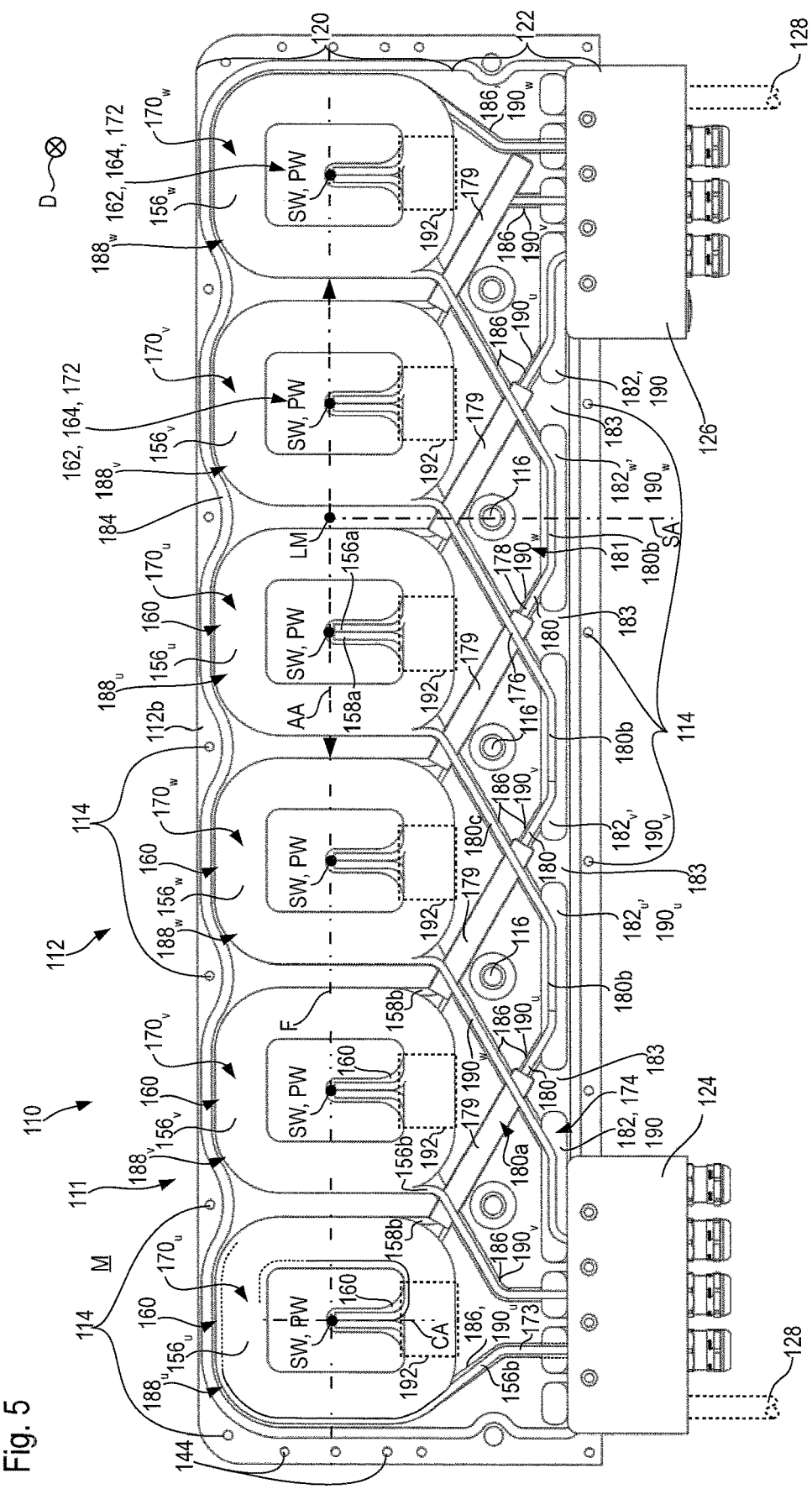

FIG. 5 depicts a second embodiment of a winding arrangement 111 and/or of a stator 110 respectively of the present invention. Identical and functionally identical components and component sections as in the first embodiment of FIGS. 1 to 4 are provided in the second embodiment of FIG. 5 with the same reference labels, but increased numerically by 100. The second embodiment of FIG. 5 will hereunder be described only in so far as it differs from the first embodiment of FIGS. 1 to 4, to the description of which reference will be made otherwise also to elucidate the second embodiment of FIG. 5.

The essential difference between the first embodiment and the second embodiment of FIG. 5 consists in the design of the cooling duct 188. In contrast to the first embodiment, in the second embodiment of FIG. 5 the cooling medium's flow in the interior of the coil housing 12 follows completely the course of the electrical conductors 173, 176, and 178. Thus, the conductor cavities 186 are configured as flow ducts 190, or put another way: the connecting conductor arrangements 180 are arranged in flow ducts 190.

Thereby there is assigned to each electrical phase one cooling duct 188, of which the flow ducts 190 respectively are a part. Furthermore, the accommodating cavities 160 and moreover the changeover region 182 form a further part of each cooling duct 188, which however in the second embodiment is subdivided by means of discontinuities 183 into a plurality of compartments. Cooling medium can flow in each cooling duct 188 without impacting the cooling medium flow in a cooling duct 188 of another electrical phase. For this purpose, the electrically insulating material layers 179 can also separate the conductor cavities 186, in which the electrical conductors 173, 176, and 178 of the respective electrical phases are accommodated, hydraulically from each other. Alternatively, however, at the intersection points of conductor cavities 186 of different electrical phases there can be permitted overflowing of cooling medium from one conductor cavity into the respective other conductor cavity. Due to the unambiguous assigning of the cooling ducts 188 to the individual electrical phases, the cooling ducts in the second embodiment, just like the flow ducts 190 and the compartments of the changeover region 182, are labeled with indices u, v, and w in accordance with their assigning to electrical phases.

The discontinuities 183 of the changeover region 182 forming flow barriers for the cooling medium, which subdivide the changeover region 182 into the number of compartments following each other along the sequence axis, are preferably configured integrally with the housing components 112a and 112b, but can also be arranged as separate sealing components in a changeover region 82 which to begin with is configured as continuous along the sequence axis F, as in the first embodiment. In one compartment of the changeover region 182 there is preferably arranged only exactly one changeover section 180b.

The cooling medium line 128 of the junction box 124, which in the embodiment example of FIG. 5 should as an example be the cooling medium supply line, consequently supplies three cooling ducts $188_u$, $188_v$, and $188_w$. The cooling medium line 128 can therefore be subdivided into three sub-lines or the division of the cooling medium supply into individual cooling ducts takes place in the junction box 124 or three cooling medium lines 128 per junction box 124 and/or 126 can be provided. Accordingly, in the second embodiment no flow ducts are provided which lead from an accommodating cavity 160 to the accommodating cavity 160 immediately adjacent along the sequence axis F.

Figure 6:
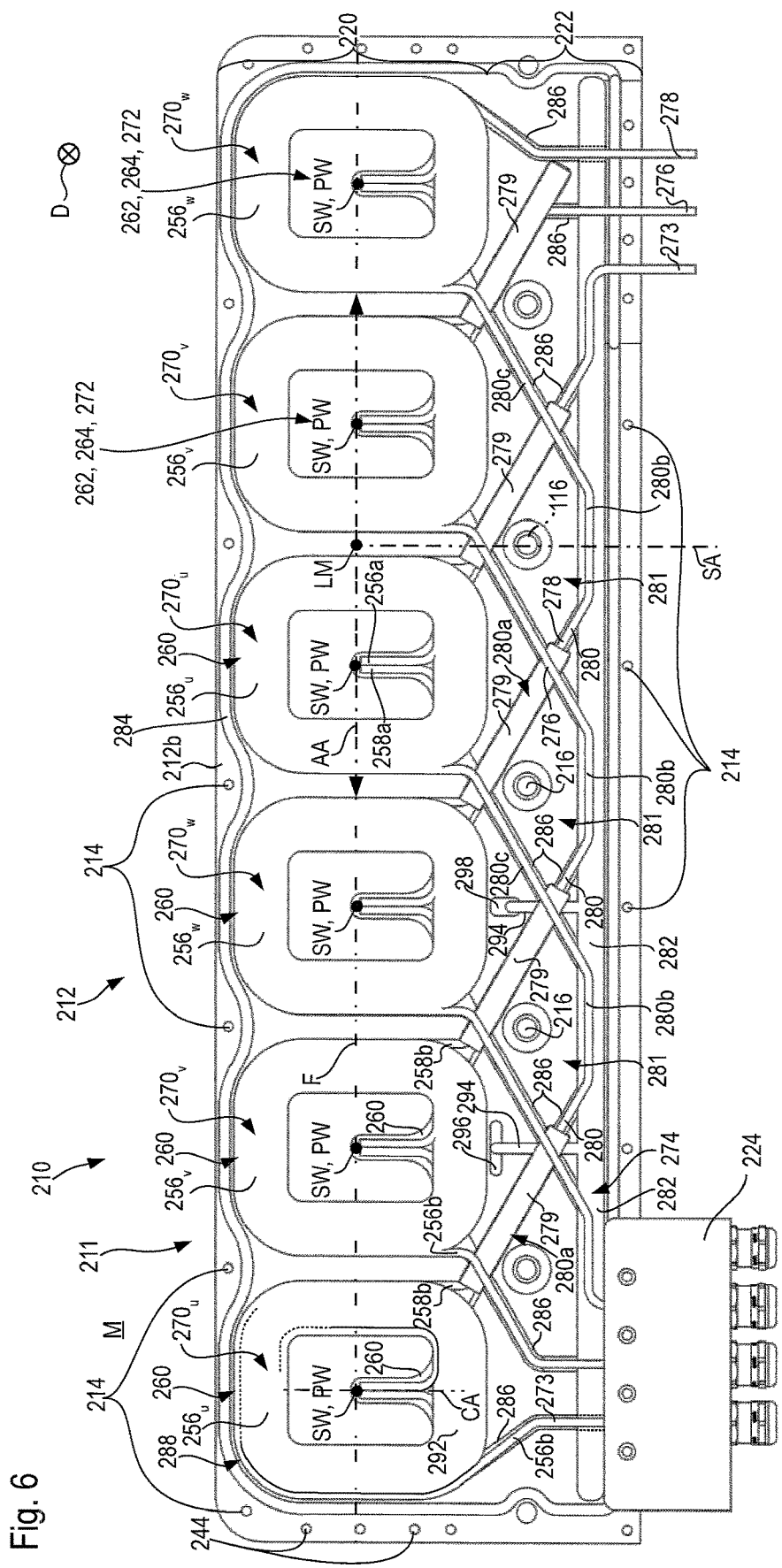

FIG. 6 depicts a third embodiment of a winding arrangement 211 and a stator 210 respectively of the present invention. Identical and functionally identical components and component sections as in the first embodiment of FIGS. 1 to 4 are provided in the third embodiment of FIG. 6 with the same reference labels, but increased numerically by 200. The third embodiment of FIG. 6 will hereunder be described only in so far as it differs from the first embodiment of FIGS. 1 to 4, to the description of which reference will be made otherwise also to elucidate the third embodiment of FIG. 6.

The third embodiment of the stator 210 and of the winding arrangement 211 respectively corresponds essentially to the first embodiment, where however in the third embodiment no cooling duct is provided. It can, however, be provided, namely either as a serial cooling duct as in the first embodiment, according to which flow ducts 90 connect with each other accommodating cavities 60 immediately adjacent along the sequence axis F, or as several cooling ducts, of which each follows the course of an electrical conductor of an electrical phase.

Accordingly, the changeover region 282 is configured as uninterrupted along the sequence axis F, since it is not provided for carrying a cooling medium flow.

From changeover region 282 as a conductor cavity 286 of the connecting conductor sections 280, there go off signal conductor cavities 294 which connect the changeover region 282 with sensor recesses 296 and 298 respectively, which are configured to be near an accommodating cavity 260 in the connection area 222 but physically separated from the accommodating cavities 260, in order to accommodate sensors with which for example a temperature of the respective single conductor coil pairs 270 accommodated in the accommodating cavity 160 can be acquired. The sensor recesses 296 and 298 are depicted in order to point out that they can exhibit arbitrary shapes, depending on the particular sensor to be accommodated inside.

In the signal conductor cavities 294 there can be accommodated signal transmission lines which transmit an acquisition signal of the particular sensor accommodated in the assigned sensor recess 296 or 298 respectively to a control device. The signal transmission lines can be led out from the coil housing 212 via the changeover region 282 and one of the junction boxes 224 or 226, in the depicted example via the junction box 224.

The junction box 226 is omitted in FIG. 6. Therefore one can see the individual electrical conductors 273, 276, and 278 in their course when exiting from the coil housing 212.

In the depicted example, the first coils 56, 156, and 256 respectively and the second coils 58, 158, and 258 respectively are each flat wire coils with exactly one winding plane. Each winding plane defines the layer 66 or 68 respectively of the assigned number of first or second coils respectively.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A conductive winding arrangement for generating a temporally and spatially varying magnetic field in a spatial neighborhood of the winding arrangement; the conductive winding arrangement comprising a plurality of coils, of which each exhibits a wire wound in several turns around a virtual coil winding axis, where the coil winding axis penetrates through a radially interior eye region free from wire turns of the plurality of coils, where the conductive winding arrangement exhibits a first layer of first coils arranged one after another without overlapping along a sequence axis with the coil winding axes parallel to each other and a second layer of second coils arranged one after another without overlapping along the sequence axis with the winding axes parallel to each other, where the conductive winding arrangement comprises a plurality of coil pairs arranged one after another along the sequence axis with a virtual coil pair winding axis oriented transversely to the sequence axis, of which every coil pair exhibits a first coil and a second coil each with a coil winding axis parallel to or collinear with the coil pair winding axis, where the first and the second coil are arranged axially adjacent to each other relative to the coil pair winding axis in such a way that wire turns of the first and of the second coil are axially adjacent to each other and the eye regions of the first coil and of the second coil are axially adjacent to each other while forming a common, spatially continuous coil-pair eye region, where the coil pair winding axis penetrates through the coil-pair eye region, at least one coil pair is configured as a single conductor coil pair, in which the first and the second coil each exhibit a connecting section lying radially outside relative to the coil pair winding axis for connecting to a phase of a power supply or to a further coil and are connected to each other electroconductively in the coil-pair eye region.

2. The conductive winding arrangement according to claim 1, wherein when regarding the single conductor coil pair along the coil pair winding axis, one coil out of the first and the second coil is wound in one winding direction from radially outside towards radially inside and the respective other coil is wound in the same winding direction from radially inside towards radially outside.

3. The conductive winding arrangement according to claim 2, wherein the first and the second coil of the single conductor coil pair are configured identically and are arranged rotated by 180° relative to each other about an arrangement axis orthogonal both to the sequence axis and to the coil pair winding axis.

4. The conductive winding arrangement according to claim 1, wherein the first and the second coil of the at least one single conductor coil pair are each coils with only one winding plane.

5. The conductive winding arrangement according to claim 1, wherein the conductive winding arrangement is configured for connecting to a power supply with different electrical phases, where each connectable phase is assigned one strand each with a plurality of single conductor coil pairs connected electrically in series, where the conductive winding arrangement exhibits at least three single conductor coil pairs following each other immediate along the sequence axis, of which every single conductor coil pair is assigned to a different phase than the two immediately adjacent single conductor coil pairs along the sequence axis between which the single conductor coil pair is arranged.

6. The conductive winding arrangement according to claim 5, wherein for every strand connected to a different electrical phase each with a plurality of single conductor coil pairs, it is the case that of single conductor coil pairs following each other immediately along the sequence axis in the strand, a radially outside located connecting section of the one single conductor coil pair with a radially outside located connecting section of the following single conductor coil pair is connected to a connecting conductor section electroconductively connecting the two single conductor coil pairs, where the one connecting section is located in the layer region of one layer out of the first layer and the second layer and the respective other connecting section is located in the layer region of the respective other layer out of the first layer and the second layer.

7. The conductive winding arrangement according to claim 6, wherein the connecting conductor section proceeds away from each of the single conductor coil pairs connected by it in a different layer than the respective single conductor coil pair and proceeds in a changeover section between the two layer regions located at a distance from the two single conductor coil pairs connected by the connecting conductor section.

8. The conductive winding arrangement according to claim 7, wherein the changeover section of at least one connecting conductor section extends on both sides of the—relative to the sequence axis—axial longitudinal middle of the axial distance between the single conductor coil pairs connected directly by the connecting conductor section.

9. The conductive winding arrangement according to claim 1, wherein the at least one single conductor coil pair is accommodated in a coil housing, where in the coil housing for each single conductor coil pair out of a plurality of single conductor coil pairs there is configured one accommodating cavity in which the single conductor coil pair assigned to the accommodating cavity is accommodated.

10. The conductive winding arrangement according to claim 9, wherein the coil housing comprises two housing components which connected with each other to form the coil housing, where of each accommodating cavity one part is configured as a recess in one of the two housing components and another part as a recess in the other of the two housing components, where the two parts of one and the same accommodating cavity configured in different housing components differ in size, in particular reach to different depths into the two housing components from the joint plane which is common to them in the connected state and is preferably orthogonal to the parallel coil pair winding axes.

11. The conductive winding arrangement according to claim 9, wherein for every strand connected to a different electrical phase each with a plurality of single conductor coil pairs, it is the case that of single conductor coil pairs following each other immediately along the sequence axis in the strand, a radially outside located connecting section of the one single conductor coil pair with a radially outside located connecting section of the following single conductor coil pair is connected to a connecting conductor section electroconductively connecting the two single conductor coil pairs, where the one connecting section is located in the layer region of one layer out of the first layer and the second layer and the respective other connecting section is located in the layer region of the respective other layer out of the first layer and the second layer; the coil housing exhibits a coil region, in which the accommodating cavities that accommodate the single conductor coil pairs are arranged, and a connection area adjacent to the coil region in which the connecting conductor sections are arranged, where preferably all the accommodating cavities are located on the same side of the connection area.

12. The conductive winding arrangement according to claim 9, wherein in the coil housing at least one cooling duct is configured into each of which at least one section of every single conductor coil pair from the number of single conductor coil pairs protrudes, such that the protruding sections are wettable by a cooling medium flowing through the cooling duct.

13. The conductive winding arrangement according to claim 12, wherein the accommodating cavities form a section of at least one cooling duct.

14. The conductive winding arrangement according to claim 13, wherein a plurality of accommodating cavities are connected with each other by a flow duct, through which the cooling medium can flow from an accommodating cavity into an accommodating cavity following it along the sequence axis.

15. The conductive winding arrangement according to claim 14, wherein a single conductor coil pair is connected to a wall of the annular accommodating cavity accommodating it in such an only locally firmly bonded manner that the firmly bonded connection allows flow of cooling medium from a flow duct supplying cooling medium to the accommodating cavity to a flow duct discharging cooling medium away from the accommodating cavity in only one flow direction along the annular accommodating cavity.

16. The conductive winding arrangement according to claim 13, wherein for every strand connected to a different electrical phase each with a plurality of single conductor coil pairs, it is the case that of single conductor coil pairs following each other immediately along the sequence axis in the strand, a radially outside located connecting section of the one single conductor coil pair with a radially outside located connecting section of the following single conductor coil pair is connected to a connecting conductor section electroconductively connecting the two single conductor coil pairs, where the one connecting section is located in the layer region of one layer out of the first layer and the second layer and the respective other connecting section is located in the layer region of the respective other layer out of the first layer and the second layer; in the flow duct connecting accommodating cavities with each other there is accommodated at least one connecting conductor section, preferably a plurality of connecting conductor sections.

17. The conductive winding arrangement according to claim 9, wherein the coil housing exhibits mounting formations, in particular through-holes penetrating through the coil housing, by means of which the coil housing can be connected, preferably detachably, with a supporting structure.

18. The conductive winding arrangement according to claim 17, wherein the coil housing exhibits a coil region, in which the accommodating cavities that accommodate the single conductor coil pairs are arranged, and a connection area adjacent to the coil region in which the connecting conductor sections are arranged, where preferably all the accommodating cavities are located on the same side of the connection area; at least one part of the mounting formations is arranged and/or configured in the connection area.

19. The conductive winding arrangement according to claim 18, wherein at least some of the mounting formations comprise through-holes penetrating through the coil housing, where each of the through-holes is arranged in a window region surrounded by connecting conductor sections.

20. The conductive winding arrangement according to claim 9, wherein in the coil housing at least one sensor recess is configured for accommodating a sensor, such as for example a temperature sensor.

21. The conductive winding arrangement according to claim 9, wherein it comprises a probe housing, in which a probe, in particular a magnetic field-sensitive probe, is accommodated, where the probe housing is connected with the coil housing.

22. The conductive winding arrangement according to claim 21, wherein the probe housing is connected as per intended use detachably with the coil housing, where preferably at the probe housing there are configured fastening formations which can be made to engage with fastening counter-formations configured at the coil housing for connecting the coil housing and the probe housing.

* * * * *